US008059798B1

(12) United States Patent
Skubisz et al.

(10) Patent No.: US 8,059,798 B1
(45) Date of Patent: Nov. 15, 2011

(54) SYSTEM FOR VOIP BASED EMERGENCY STAND ALONE SERVICE

(76) Inventors: Michael A Skubisz, Durham, NH (US); Edward F Holmes, Durham, NH (US); Brian St. Pierre, Acworth, NH (US); David L Cullerot, Nashua, NH (US)

( * ) Notice: Subject to any disclaimer, the term of this patent is extended or adjusted under 35 U.S.C. 154(b) by 1059 days.

(21) Appl. No.: 11/847,524

(22) Filed: Aug. 30, 2007

Related U.S. Application Data (60) Provisional application No. 60/841,077, filed on Aug. 30, 2006.

(51) Int. Cl.
*H04M 15/00* (2006.01)
(52) U.S. Cl. ......... 379/112.02; 379/221.03; 379/221.04; 379/279; 370/216; 370/221
(58) Field of Classification Search ............. 379/112.02, 379/221.03, 221.04, 279; 370/216–221
See application file for complete search history.

(56) References Cited

U.S. PATENT DOCUMENTS

| | | | | |
|---|---|---|---|---|
| 7,257,205 | B2 * | 8/2007 | Forte | 379/112.02 |
| 7,539,131 | B2 * | 5/2009 | Shen | 370/217 |
| 7,542,462 | B1 * | 6/2009 | Murphy | 370/352 |
| 2005/0105559 | A1 * | 5/2005 | Cain et al. | 370/498 |
| 2007/0041327 | A1 * | 2/2007 | Foster et al. | 370/242 |
| 2007/0071182 | A1 | 3/2007 | Elder et al. | |

OTHER PUBLICATIONS

"Emergency Stand Alone Switch", Aztek Networks, 2006, pp. 1-2, Aug. 30, 2007.
Bahner, Todd, "TelStrat Helps Great Plains Communications Prepare for Any Emergency", TelStrat, 2006, pp. 1-3, Aug. 30, 2007.
"Innovative BLC-Based Resiliency Assures Network Reliability for Local or Emergency Calling", Zhone Technologies, 2007, 1 page, Aug. 30, 2007.

* cited by examiner

*Primary Examiner* — Quynh Nguyen
(74) *Attorney, Agent, or Firm* — Vern Maine & Associates (57) ABSTRACT

Method and apparatus for ad hoc cooperative routing in an IP network. Included is an emergency stand alone (ESA) system that provides a bypass to a failed TDM switch for multiple communication devices in communication with one or more TDM switches. One or more internet protocol media gateways communicate a multicast signal upon the failure of a switch. The multicast initiates Voice over IP communication between endpoints, bypassing the failed switch.

3 Claims, 8 Drawing Sheets

SYSTEM FOR VOIP BASED EMERGENCY STAND ALONE SERVICE

RELATED APPLICATIONS

This application claims the benefit of U.S. Provisional Applications No. 60/841,077, filed Aug. 30, 2006, which is herein incorporated in its entirety by reference.

FIELD OF THE INVENTION

The present invention generally relates to telephony and more specifically to Voice over Internet Protocol ("VoIP") telephone service as it relates to VoIP based Emergency Stand Alone Service.

BACKGROUND OF THE INVENTION

The public switched telephone network (PSTN) is the network of the public circuit-switched telephone networks that provide the majority of voice services. The PSTN is largely governed by technical standards and uses standardized addresses, namely telephone numbers. PSTN was originally a network of fixed-line analog telephone systems; however the present PSTN is almost entirely digital, and includes mobile phones. While the technology continues to change, the majority of users in the public still use the typical fixed telephone handset service which is sometimes referred to as the Plain Old Telephone Service (POTS).

In a traditional public switch telephone network there are two basic system elements, namely the switching device and the access device. The switching device in a local exchange is generally referred to as a Class 5 switch. The class 5 office is the local exchange or end office, and it delivers dial tone to the customer. The end office, also called a branch exchange, is the closest connection to the end customer. The function of a Class 5 switch in rural areas is often performed by some form of remote switch or Remote Digital Terminal (RDT) which is installed at the original switch site to handle local switching. The Class 5 switching infrastructure is then physically located in a larger population center. The switch provides the call control, call features and routing information necessary to complete a telephone call within a carrier's exchange. The term switch as used herein refers to any of the various switch types.

The access device, sometimes referred to as a Digital Loop Carrier (DLC) or Broadband Loop Carrier (BLC), provides the physical interface to the subscriber's telephone equipment. This interface typically includes battery voltages to power the telephone equipment, ringing voltages necessary to ring the telephone equipment when an incoming call in received, and the analog to digital conversion required to interface with the switches. An access device can encompass IP Media Gateways (IPMGs) when capable of communicating by internet protocol. An IPMG is any type of access device that can support IP ESA provisioning, supporting multicasting.

Under normal operation, the access device or IPMG and the switch are required to have a reliable communications path available for a telephone call to be made, even between two subscribers connected to the same access device or IPMG. Despite the size of the public switched telephone network, it averages approximately 99.999% availability and employs various redundant features, especially in the older established networks and those with dense populations.

Digital Loop Carriers (DLCs) or next-generation access systems such as BLCs are excellent devices for terminating subscriber access lines, reducing loop plant or providing concentration of access lines. However, most DLCs also represent a critical point of failure in a carrier's network because if the link between the host switch and the DLC is severed, the DLC will be unable to complete any local calls including emergency 911 calls. Today, over half of all access lines in the United States are terminated on DLCs, few of which have any back up or fail-safe switching capability. This represents a large and potentially critical point of failure in the PSTN and a public safety concern for all carriers.

One area of concern for the public is network redundancy to achieve Emergency Stand Alone, especially with the high cost of added equipment typically required for such redundant capability. The redundancy for upgrades to replace older networks and for new installations drives the cost of network construction up significantly. Rural telephone market consists of large geographic areas with relatively low density of subscribers. The ability to economically build a fully redundant network is not feasible.

Emergency Stand Alone also called Emergency Standalone (ESA) refers to the capability of an area within a voice network to be self sufficient and capable to operate and complete all calls originating and terminating within that service area even if the connection to the broader public switched telephone network has failed. There are typically two levels of calls that are handled in the ESA mode, namely the regular calls that would normally be routed via the switch and emergency calls such as 911.

By way of example, the loss to the switch could be the result of equipment failure, a fiber optic failure or a metallic cable failure. It could also be related to a power outage in which the emergency and/or battery power fails. Also, internal operational/software failure can contribute to the loss. Typically, every access device in the network which could suffer such connectivity loss would be required to have an ESA device in order to ensure calling services would be intact in the event of a hardware or fiber failure.

Historically, ESA service has been provided by a central office host switch or a subtended remote switch unit, both of which are broadly referred to herein as switches. If the connection between the central office host switch and the broader public switched telephone network was lost, the central office host switch would attempt to complete all local calls and route all 911 calls to a local public service answering point. Similarly, if the connection between the remote switch unit and the central office host switch was severed, then the remote switch unit would continue to attempt all local calls within its service area and generally route all 911 calls to a pre-designated emergency responder, such as the local fire or police department. Access concentration devices such as Digital Loop Carriers (DLCs) and the newer generation of Broadband Loop Carriers (BLCs) traditionally do not have any switching capability and thus lack emergency stand alone service.

In a general sense, ESA provides a mechanism whereby the access device can still provide the ability to complete calls between subscribers attached to it even in the event connectivity to the switch is lost. As noted, this typically requires that additional hardware is required and that the ESA domain, or scope of the subscriber lines covered by the ESA, is limited to a predefined area.

There have been some attempts for providing emergency stand alone services such as by installing low end switches in remote locations or requiring a switch for every town, and some networks even required all central offices to have switches. Large remote sites sometimes have installed cards that would allow form of stand alone operation.

As the technology has evolved, the handling capacity has increased and the equipment size has decreased. In combination with the enhancements for soft switching, there has been a trend towards consolidation and larger central offices as opposed to many discrete offices. Soft switching refers to the processing within the switch controller wherein the switch maintains a database of the endpoints and their respective addresses. There are tables that enable the switch to route traffic to the intended destination as the switch has predetermined information about the endpoint. Such trends create a greater vulnerability to loss of voice lines as a single failure could lead to greater outages of voice communication.

As Voice over Internet Protocol (VoIP) telephone service has gained market momentum in the PSTN market, the requirement for ESA has not diminished. VoIP is a technology that allows a user to make voice calls using a broadband Internet connection instead of a regular (or analog) phone line. Voice over Internet Protocol, also called VoIP, IP Telephony, Internet telephony, Broadband telephony, Broadband Phone and Voice over Broadband generally refers to the routing of voice communications over the Internet or through any other IP-based network. VoIP systems traditionally employ two components, namely a switch and the terminal adapters or client. The switch is the brain that determines the processing for the various endpoints, wherein the endpoints are subservient to the switch.

VoIP providers follow established protocols to carry voice signals over the IP network, wherein the system converts voice into digital signals that travel over the Internet. If calling a POTS handset, the signal is converted to a regular telephone signal before it reaches the destination. VoIP allows calls directly from a computer, a special VoIP phone, or a traditional phone connected to a special adapter. In addition, wireless hot spots in locations such as airports, parks, and cafes allow you to connect to the Internet and may enable VoIP service wirelessly.

There are a variety of VoIP protocols as well as VoIP systems. There is typically a terminal adapter that is coupled to the hand set during the dialing of a telephone call that sends the dialing information back to a switch and the switch determines the outcome such as converting the dialed numbers into the proper format and providing some ring tones back to the user. The IPMG takes user input and converts between the VoIP and handset. Redundancy typically requires that there is always a switch between the VoIP client and the switch. In dense areas, there may be multiple connections to a switch such that the VoIP clients can be re-routed to the switch if one connection is inoperable. However, in rural environments, there is no guarantee of a surviving path between the VoIP clients and the switch controlling the phone service if a connection is broken.

The traditional approach to provide ESA capabilities in the VoIP scenario is not very different from the approach taken in the division multiplexing (TDM) environment. Typical VoIP based ESA requires that for each ESA domain an additional device or module would need to be installed to guard against connectivity loss to the switch.

Figure 1:
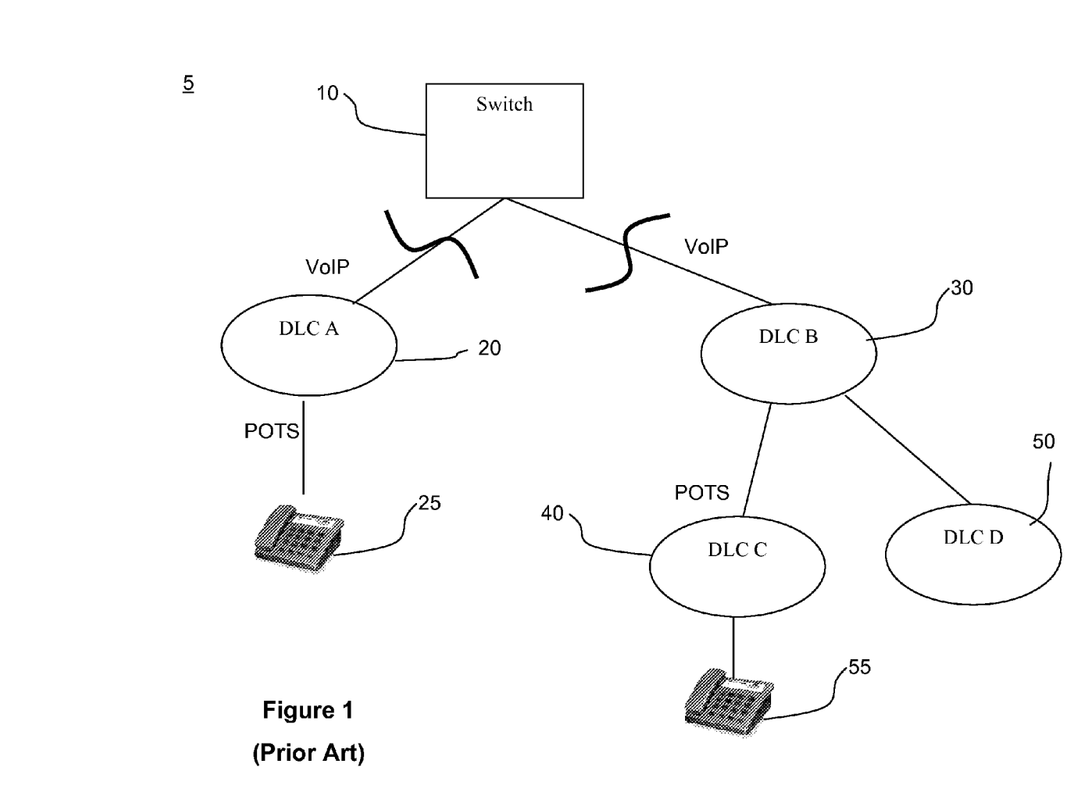
FIG. 1 is a block diagram illustrating a prior art VoIP system.

As can be seen in FIG. 1, a prior art VoIP system 5 is depicted with a switch that can be a central office host switch or a subtended remote switch unit, which includes Class 5 switches and RDT.

The switch 10 may be coupled to other switches (not shown) or a central host to provide some form of ring network. In this system 5, there is a first DLC A 20 coupled to a first POTS handset 25. The DLC can be coupled to multiple handsets. The DLC is basically an analog/digital (A/D) converter that performs the necessary translation processing between the POTS handsets and VoIP infrastructure, and establishes the various communications protocol with the switch 10. The switch 10 in this example is also coupled to a second DLC 30 as well as nested access devices 40, 50. The third DLC 40 is also coupled to a POTS handset 55. It should be understood that this is just one representative example of the prior art implementations and other variations are known to those skilled in the art.

By way of an illustrative example, if a party using a POTS handset 25 dials a telephone number, the DLC 20 performs the processing to convert the Dual-tone multi-frequency (DTMF) or pulse telephone number into the proper VoIP communications protocol. The switch 10, with its apriori knowledge of the telephone numbers in the network, routes the signal to the proper location and corresponding handset 55 whether it is a wireless caller, VoIP client or another POTS handset. If communicating to another POTS handset one or more receiver DLCs 30, 40, 50 is used to translate the digital VoIP communications back into the POTS protocol so that it is received by the receiver POTS handset 55 in the proper format.

The switch 10 typically follows call admission control that manages administrative aspects such as whether the dialed telephone number is valid, whether the caller is allowed to make the call based on the caller account, whether the receiving party is in the network, or whether the receiving party is busy or on a failed network. Various handshaking occurs prior to the connection between the caller and receiver which is administered by the switch prior to successful completion of the call.

In the event that the switch is inoperative, ESA service in the state of the art requires pre-existing added hardware elements. In order to provide such full ESA capabilities, an ESA device or switch (not shown) must be added and coupled to DLC A-D 20, 30, 40, 50. Furthermore, in the event that the link from the switch 10 to DLC B 30 were to fail, the connectivity between DLC C 40 subscribers and DLC D 50 subscribers would require complex routing knowledge provisioned in each ESA device to allow calls to be completed properly.

For example, when a user wants to make a telephone call from a standard POTS handset on a network that employs VoIP, the user picks up the receiver and a dial tone is provided by the VoIP client. The user dials the desired telephone number and The VoIP client makes a number of efforts to route the call to the switch.

Several approaches and systems have been contemplated to provide redundancy with limited success. There are collapsed rings providing local redundancy but the lines are typically in the same trench and this would not aid in a failure further upstream from the ring.

Some existing systems employed an auxiliary switch that waits for the master switch to be offline and then takes control of the network traffic. This is not a distributed approach and requires a sufficient number of auxiliary switches which can be costly to implement. One embodiment of the invention is a distributed ESA approach that adds the multicast functionality into the VoIP endpoints such that they can operate independently if the switch is offline.

In addition, there are a few implementations that have evolved for converting the VoIP to POTS electrical interface. For example, in the Vonage system, a user sets up an account on the user's computer. Vonage wants a switch with the database of known endpoints that maps phone numbers to IP addresses. The Vonage system establishes an electronic adapter in every house and converts the VoIP to the POTS handset at the house. A disadvantage of this approach is that a loss of power will result in loss of the telephony.

The telephone company system approach places the VoIP-POTS transfer mechanism as part of the network and customer is presented the standard two-wire POTS connection at the house. If the power is lost at the house, the phone line may still be powered as long as there is power to the VoIP transfer mechanism, which typically has some battery backup.

In general, the industry move towards digital communications and VOIP has facilitated the migration away from remote offices which increases the exposure to loss of emergency voice lines in the event of a failure at a central office or central office line.

The fiber-to-the-home (FTTH) initiative has been slowly converting existing cables to fiber but the economics requires a certain density to make the conversion cost effective. Present rural implementations use fiber out to a remote cabinet and the 'last mile' to the home using existing copper wire using, for example, ADSL, or in-the-house POTS adaptation. While new developments can go immediately to fiber, it will be many years before all the cabling is replaced by fiber, especially in less dense areas.

The premise devices are also continuing to evolve and incorporate processing and communications capability. The premise device can be a network interface device (NID) also sometimes referred to as a network interface unit (NIU) which is a multi-functional device that acts as an interface providing code conversion, protocol conversion and buffering used for communications to/from a network. The NID in some applications allow a number of independent devices, with varying protocols, to communicate with each other and converts a device protocol into a common transmission protocol. The transmission protocol may be chosen to accommodate directly a number of the devices used within the network without the need for protocol conversion for those devices by the NID.

Despite the advances to a purely digital network, however, as long there are standard handsets in the field employing the POTS interface, there is a requirement for converting VOIP to POTS.

Thus there is a need for emergency stand alone services since the network is not resilient enough to tolerate failure without disrupting life line voice services. One of the principal economic challenges to providing full ESA capabilities is the requirement for added equipment. In addition, there is the additional complexity of programming routing information needed to complete calls under the existing ESA even though the ESA domain is static and refers to a single physical location. What is needed, therefore, is a system and techniques for routing ESA calls without the burden and cost of auxiliary hardware such as switches.

SUMMARY OF THE INVENTION

One embodiment of the present invention provides an emergency stand alone (ESA) system that bypasses a failed TDM switch for multiple communication devices in communication with one or more TDM switches. One or more internet protocol media gateways communicate a multicast signal upon the failure of a switch. The multicast initiates IP communication between endpoints, bypassing the failed switch.

One embodiment includes a method for conducting backup emergency stand alone communications in a communications network employing both switch and internet access devices for call routing. It comprises using a plurality of communications devices for connecting network end points, the communication devices including at least one switch and including at least one emergency stand alone-enabled internet protocol media gateway. It attempts a call from a first end point in the network through an ESA-enabled internet protocol media gateway to a second endpoint in the network, and detects a normal mode of operation failure. It initiates a multicast call setup request from the emergency stand alone-enabled internet protocol media gateway, the request including a multicast internet address, a first end point directory number, and a second end point directory number. It further monitors the network by all emergency stand alone-enabled internet protocol media gateways for a multicast call setup request for which the second end point directory number matches a respective, available, emergency stand alone-designated local end point directory number. Upon receipt thereof, it initiates a response to the call setup request that includes the unicast internet protocol address of said local end point. It completes the call between the first end point and second end point using IP unicast addresses. In a further embodiment, the multicast call setup request and response to the call setup request comprise voice over internet protocol.

In yet a further embodiment, the normal mode of operation comprises time division multiplexing.

In another embodiment, the multicast call setup request and response to the call setup request further include an internet protocol multicast group address, a multicast distribution tree, and a receiver driven tree.

In yet another embodiment, the emergency stand alone-designated local end point directory number further matches a domain comprising a subset of all emergency stand alone-enabled end point directory numbers. The network end points may be internet protocol media gateways.

Another embodiment is a backup distributed system for emergency stand alone communications comprising a plurality of communication devices in communication with at least one switch, the communication devices including at least one internet protocol media gateway. The internet protocol media gateway is configured to initiate a multicast upon failure of said switch and the multicast enables internet protocol communication between endpoints thereby bypassing said switch.

In an embodiment, the system has a plurality of communication devices that support voice over internet protocol.

In another embodiment, the communication devices support time division multiplexing.

In yet another embodiment, the multicast includes an internet protocol multicast group address, a multicast distribution tree, and a receiver driven tree.

In a further embodiment, the multicast enabling internet protocol communication between endpoints comprises peer to peer unicast.

Another embodiment, is a method for multicasting including the steps of attempting a communication in a normal mode of operation; detecting a failed normal mode of operation; checking for emergency stand alone provisioning; sending at least one call setup request including an internet protocol multicast group address; responding to at least one call setup request with a response, the response including a unicast internet protocol address of a terminating gateway; and completing the communication as peer to peer unicast.

In another embodiment, the steps of checking, sending, responding, and completing comprise voice over internet protocol.

In yet another embodiment, the normal mode of operation comprises time division multiplexing.

In a further embodiment, the step of responding to at least one call setup request includes determining if a directory number is a provisioned emergency stand alone number.

In yet a further embodiment, the step of sending at least one call setup request includes normalizing an endpoint directory number.

In another embodiment, the step of completing the communication includes monitoring availability of the normal mode of operation.

In one embodiment, an internet protocol time division multiplex hybrid device includes a time division multiplex path including a framer in time division multiplex communication with a plain old telephone service interface. It further includes an internet protocol path which includes said plain old telephone service interface in time division multiplex communication with a voice digital signal processor in internet protocol communication with a network processor including a central processing unit and a switch. The central processing unit is configured to support internet protocol emergency stand alone backup for time division multiplex communications. The plain old telephone service interface, voice digital signal processor, and network processor are in communication with a peripheral bus. The network processor is further in communication with the framer and the plain old telephone service interface is in communication with the plain old telephone service equipment external to the device. The framer is in communication with time division multiplex equipment external to the device and the network processor is in communication with internet protocol equipment external to the device. In another embodiment, the internet protocol time division multiplex hybrid device's internet protocol includes voice over internet protocol. In yet another embodiment, the hybrid device is configured to support voice over internet protocol emergency stand alone communications while operating in time division multiplex mode.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

One general embodiment the present invention is to provide ESA capabilities, imposing minimal requirements, providing dynamic and flexible ESA domains and requiring no routing information to be provided in order to process communications within or between ESA domains.

The present invention according to one embodiment operates on a VoIP network containing a plurality of devices with least one IPMG, at least one switch and some interface mechanism for any required conversions.

The invention in one embodiment tries communicating to the switch and after a set of failures, the various VoIP clients or endpoints attempt to provide communications without the switch being present in an ESA mode. There are a number of recovery mechanisms or configurable parameters that may be tried prior to entering ESA mode multicasting which can be set forth by the protocol or by the user.

Figure 2:
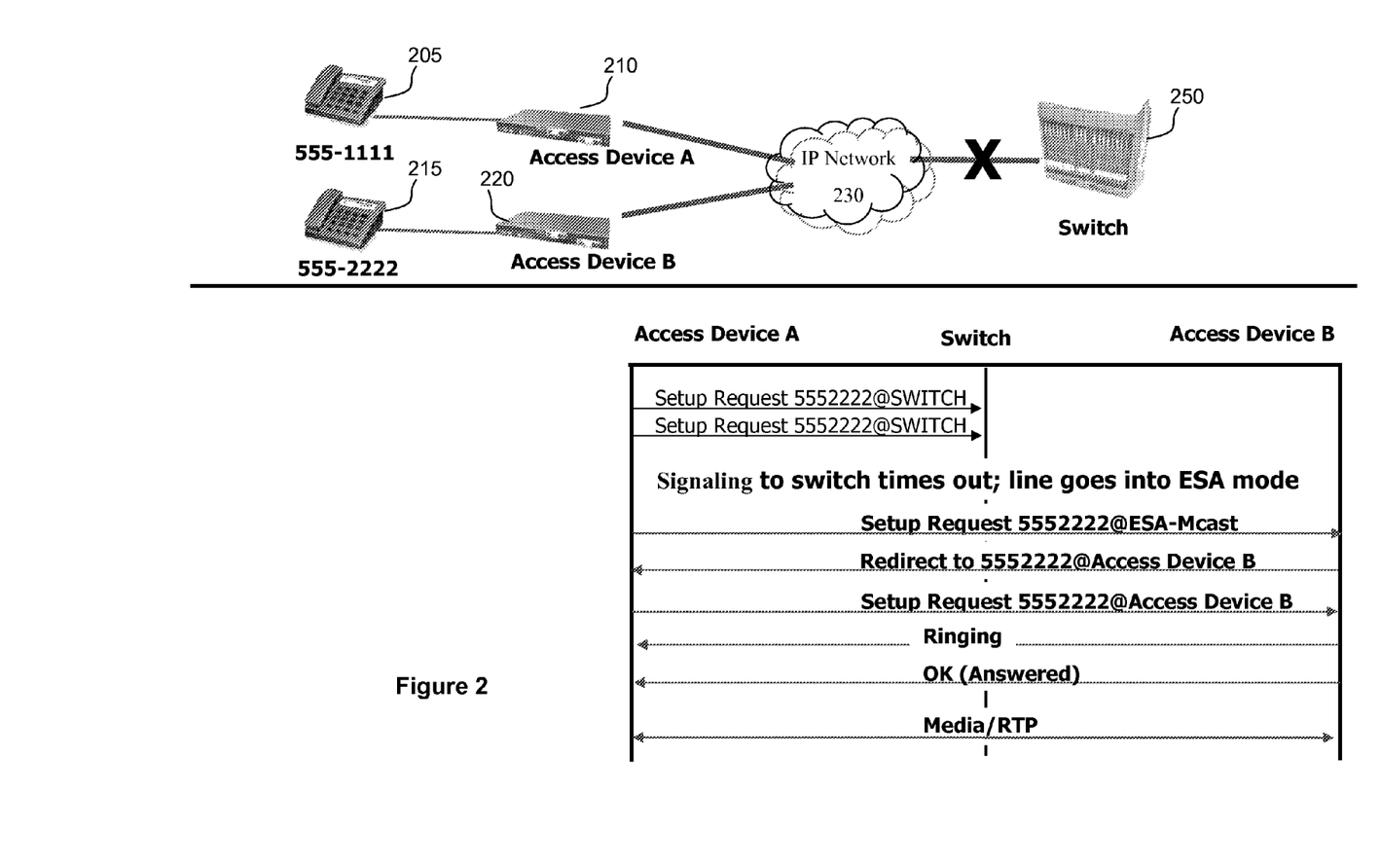
FIG. 2 shows a simplified ADSL/POTS call in ESA mode according to one embodiment.

Referring to FIG. 2, a simplified block diagram for the basic call flow of an ADSL/POTS deployment in the ESA mode is depicted. This describes any two way communications. The originator caller at telephone number 555-1111 calls the destination caller at telephone number 555-2222 across the network. Upon dialing the destination caller telephone number on the originating POTS handset 205, the access device 210 converts the POTS communications to VoIP protocol and sends the VoIP protocol setup request across the network to the switch 250. The access device IPMG as used herein refers to any of the various conversion components such as DLC and BLC and includes multi-protocol translations.

According to one embodiment, the access device 210, such as a DLC or BLC, is provisioned with redundant switches. The access device is provisioned with an ESA multicast group address and ESA Domain ID.

In a FTTH environment, the access device 210 can be coupled to customer premises equipment (CPE) (not shown) which can join an ESA group via the Internet Group Management Protocol which is a communications protocol used to manage the membership of IP multicast groups. IGMP is used by IP hosts and adjacent multicast routers to establish multicast group memberships. Handset 205 and access device 210 may be referred to as an IP media Gateway (IPMG) and comprise one or multiple components.

Upon a failure mode, such as a timeout after a number of tries, the IPMG or access device 210 enters ESA mode and sends out a multicast call setup request (MCSR) over the network 230 to the devices on the ESA domain. Note that call setup is not limited to voice calls, but includes video, data, text or the like connections. Multicast processing is commenced by the VoIP client sending out the call setup request to ESA multicast addresses as opposed to a broadcast to all endpoints. The multicast packet is transmitted only to those portions of the network where there are devices listening to that particular multicast address. In contrast to a broadcast message, only those devices that are listening for that multicast signal will process it. The other ESA end points are designed to listen for the ESA multicast on the network. The access device B 220 listens for such multicast signals and acknowledges the setup request by sending a multicast call setup request response (MCSRR) to the origination access device 210 or IPMG; the destination number is on IPMG 220.

Referring again to FIG. 2, IPMG 210 checks at start up to see if it is provisioned for backup ESA operation. If so, upon a failure of its normal operating mode, such as a timeout after a number of tries through switch 250, the IPMG or access device 210 enters ESA mode and upon attempts of user 205 to place a call, sends out a multicast call setup request signal over the network 230, using a multicast group address, to all ESA enabled devices on the ESA domain. The request will contain the originating device A 210 IPMG's IP address as well as the calling user 205 and called user 215 directory numbers. ESA enabled devices on the domain including access device B 220 listen for an ESA multicast call setup request signal. Upon recognizing the user 215's local directory number in the call request, device B 220 issues a response to the request, sending a signal back to the origination access device 210. The response provides the unicast IP address of the terminating gateway, in this case, B 220. Thereafter, the communication is completed directly between the originating and terminating IP gateways in peer to peer fashion using unicast IP addresses. This general scheme for providing backup distributed system of ESA, in all its various method and system embodiments, is referred to herein as multicast.

In ESA mode according to one embodiment, the various endpoints have multicasting capability. Multicasting refers to a technique that allows for communications to one or more receivers without having prior knowledge of the individual receivers. In a network environment, multicast utilizes the network infrastructure efficiently by requiring the source to send a packet only once, even if it needs to be delivered to a large number of receivers. The nodes in the network take care of replicating the packet to reach multiple receivers only where necessary. The IP Multicast typically includes an IP Multicast group address, a multicast distribution tree and receiver driven tree creation. An IP Multicast group address is used by sources and the receivers to send and receive content. Sources use the group address as the IP destination address in their data packets. Receivers use this group address to inform the network that they are interested in receiving packets sent to that group.

According to one embodiment of the invention, the network incorporates the multicast capability into each of the VoIP clients such that the endpoints are a backup distributed system for ESA communications.

The VoIP client such as an IPMG, then transmits a multicast packet to the existing network in which the switch is presently not communicating.

Under normal operating circumstances, the Access Devices and/or other VoIP devices would utilize signaling protocols such as session initiation protocol (SIP) or media gateway control protocol (MGCP) to establish a telephone call via the switch. The switch would provide the call control, call features and routing information for the VoIP devices. The VoIP devices would provide the necessary signaling messages and handle the media conversion from analog to digital IP packets. In one example, the VoIP devices are unable to provide telephone calling services without valid connectivity to the switch.

The origination IPMG 210 then communicates directly back (unicast, direct peer to peer, not multicast) to the destination IPMG 220 which converts the VoIP signal back into POTS and the handset 215 rings. If answered, the call is completed and the voice communications commences. There are various handshaking parameters depending upon the system and protocols.

Figure 3:
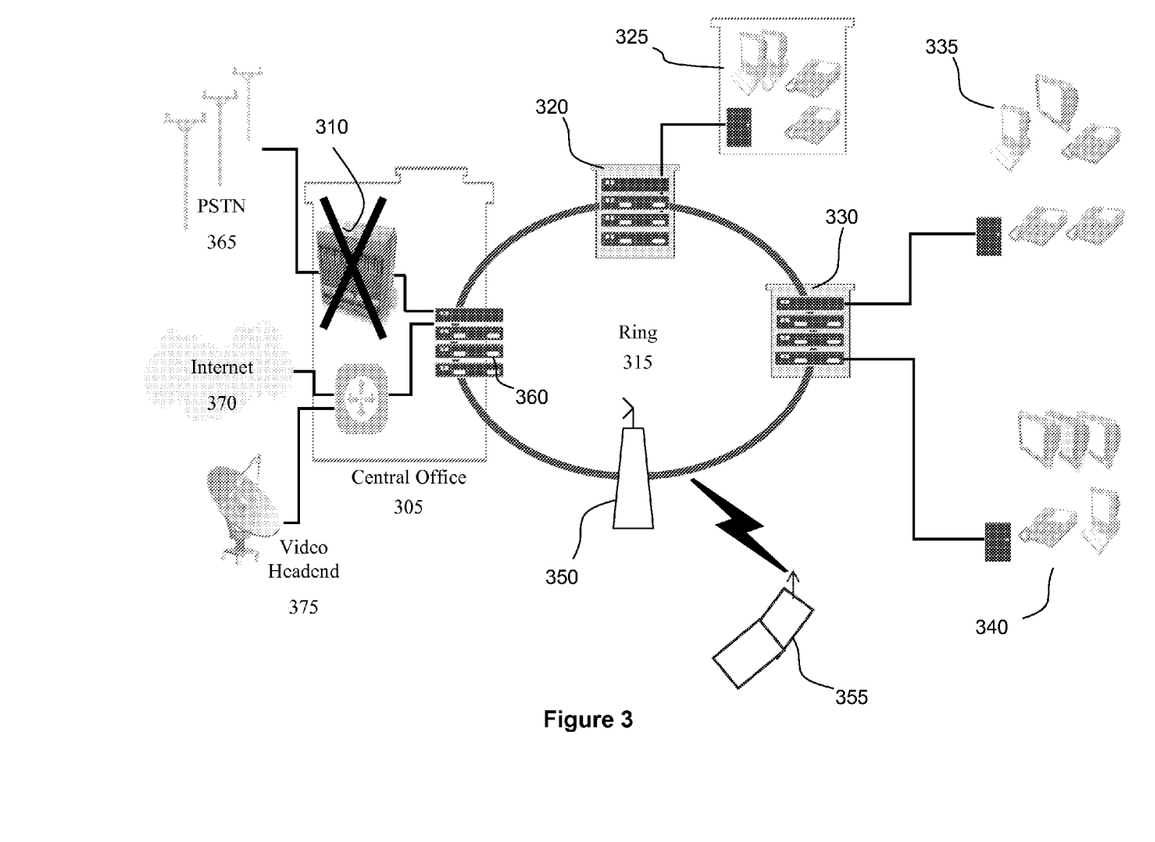
FIG. 3 is a top level diagrammatic perspective of an ESA enabled network with a broken connection at the switch in accordance with one embodiment of the invention.

Referring to FIG. 3, one broadband access system embodiment shows the various coupling of an ESA enabled network in a FTTH environment with ESA enabled devices having assigned directory numbers (DNs) wherein each ESA enabled device in the ESA network shares a common IP multicast signaling address. The system provides for voice, data, and video communications from a number of service providers to a variety of customer premises devices, such devices can have conversion features built into the devices or have the conversion implemented separately.

For illustrative purposes, in this example, there is a central office 305 including a switch 310 that is coupled to the PSTN 365, the Internet 370, a video headend 375, and a cell tower base station 350. The base station 350 is communicatively coupled to the switch 310 thereby allowing access to/from wireless callers and those in a wireless network.

A plurality of geographically dispersed nodes 320, 330, 350, 360 form a ring 315 that provides for communications with the switch 310 of the central office 305. These nodes could be IPMGs. In The ring 315 allows the devices to potentially communicate with the switch 310 even if a portion of the ring 315 is broken. The nodes in one embodiment are access devices or IPMGs, either single or multiple.

There are a plurality of customer premises equipment (CPE) devices 325, 335, 340, 355 that have DNs assigned and also have an established common IP multicast signal address. They can be any two way device for audio, video, data, text, or combination thereof. Each of the CPE devices is communicatively coupled to the nodes 320, 330, 350, 360 and also to various electronic devices such as telephone handsets, computers, wireless gear, and fax machines capable of transmitting and/or receiving IP data. The example shown includes a node depicting a cell transmission tower 350 and cell phones 355. The electronic devices however, can be any number of devices, some of which include POTS handsets, computing device, facsimile machine, and VoIP handsets. Some of the devices may require certain conversions to the proper protocol. Any one of the identified components can be IPMGs and provide for conversion anywhere in the system.

Figure 4:
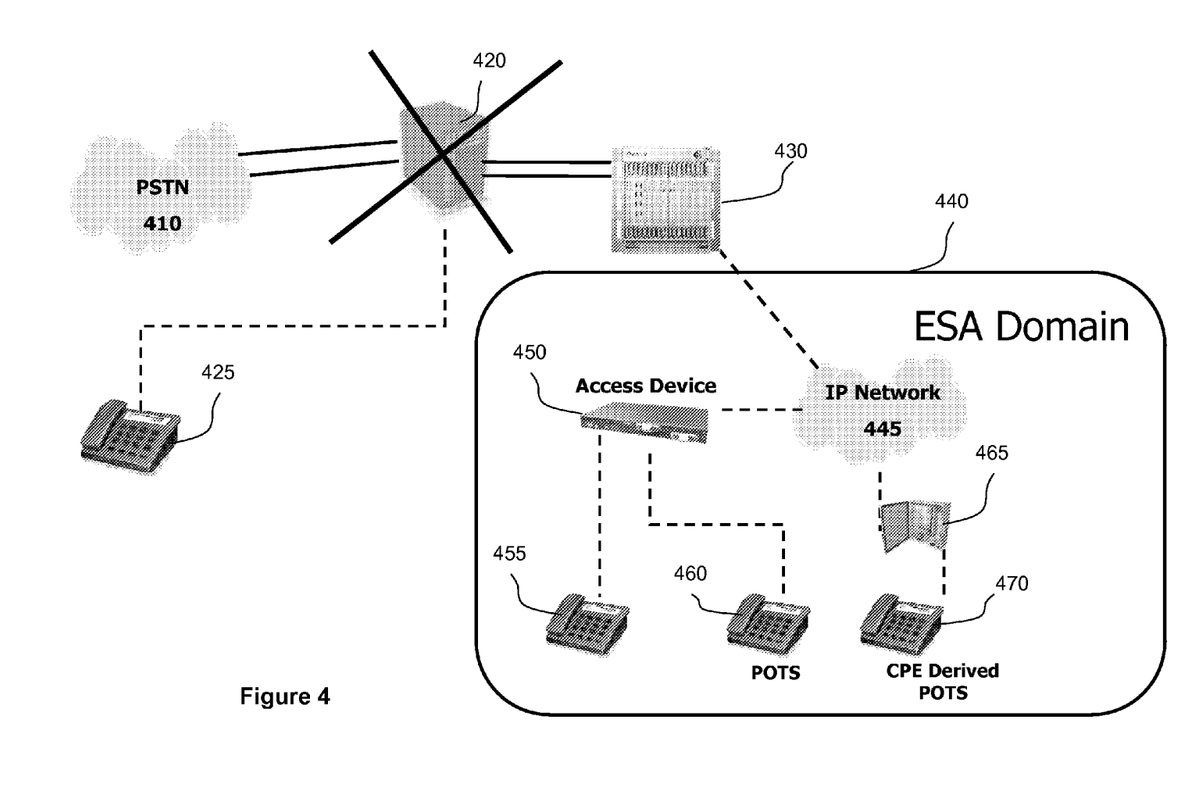
FIG. 4 illustrates the diagrammatic perspective of ESA in a MGCP/GR303 environment in accordance with one embodiment.

The ESA operation in a TDM and IP environment in one embodiment is shown in FIG. 4. The PSTN 410 is communicatively coupled to the switch 420 typically by bearer trunks and an A link. The switch 420 can also be coupled to any number of handsets and peripheral devices including POTS handsets 425. The switch 420 also couples to an IPMG 430 generally.

Media Gateway Control Protocol (MGCP) is a protocol used within a distributed VoIP system, wherein the distributed system has a Call Agent (or Media Gateway Controller) and at least one Media Gateway (MG) that performs the conversion of media signals between circuits and packets, and at least one Signaling Gateway (SG) when connected to the PSTN. The Call Agent uses MGCP to report information to the Media Gateway. MGCP also allows the Call Agent to audit the current state of endpoints on a Media Gateway. The Media Gateway uses MGCP to report events to the Call Agent. The Signaling Gateway may or may not be on the same physical switch as the Media Gateway Controller.

The Next-Generation Digital Loop Carrier devices are striving for integrated access systems, and, by way of example, the GR-303 devices support multiple distribution technologies and architectures (e.g., DSL, HFC, Fiber-to-the-Curb, etc.), and a wide range of services (narrowband and broadband) on a single access platform.

An IPMG 430 is coupled to an IP network 445 for an ESA domain 440, wherein the domain represents all those ESA devices accessible by the particular IPMG. Within the ESA domain 440, the IP network 445 can communicate with one or more IPMGs or access devices 450, wherein the access devices can deliver the voice, data, and video to the various handsets including POTS handsets 455 and VoIP handsets 460. The network 445 can also be coupled to the CPE 465 that in turn can connect to CPE derived POTS 470. The VoIP network for the ESA domain 440 essentially appears as one or more DLCs. The IPMG can comprise both access devices and handsets.

Figure 5:
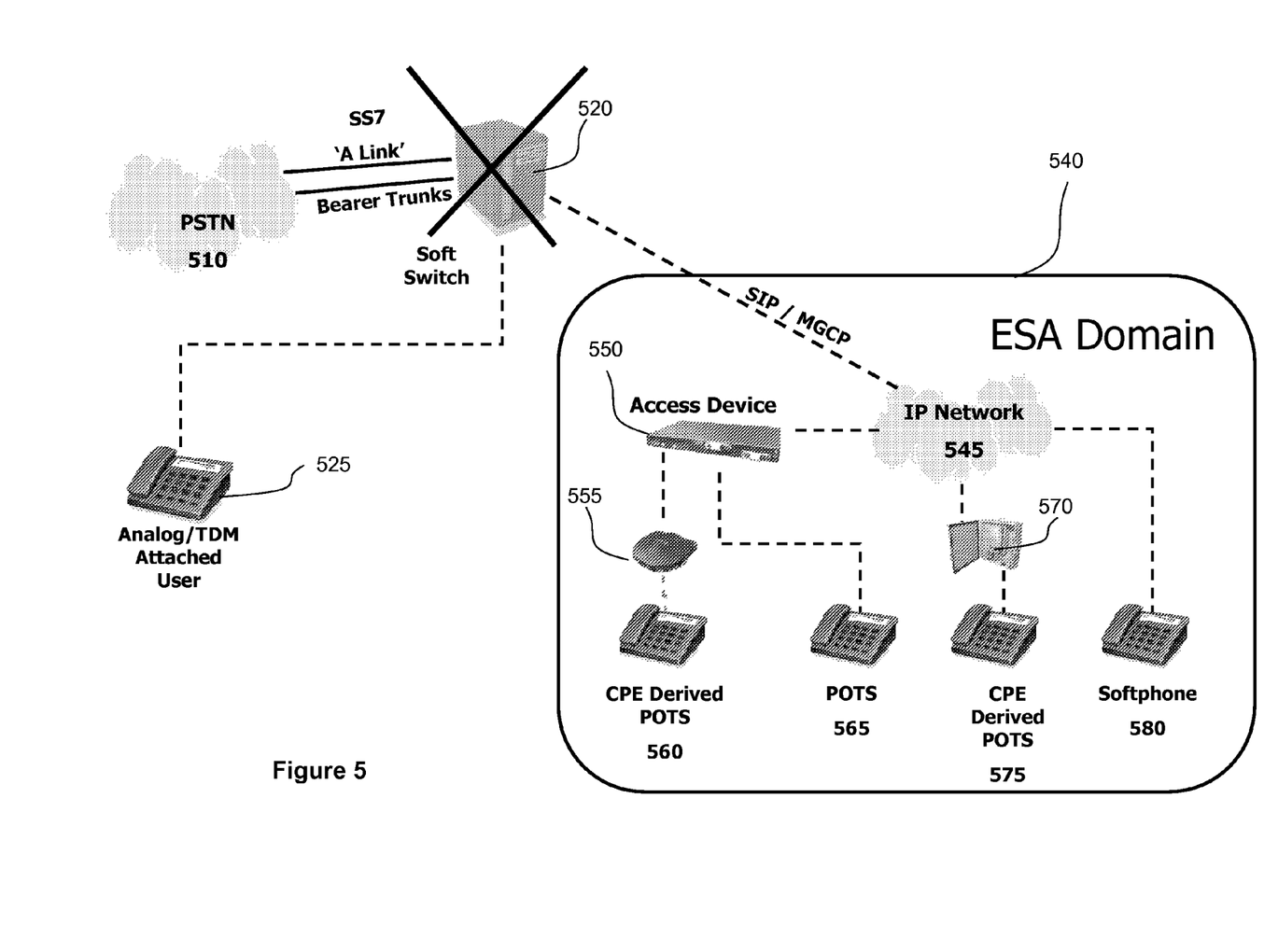
FIG. 5 illustrates the diagrammatic perspective of ESA in a softswitch environment in accordance with one embodiment.

A further embodiment is shown in FIG. 5 illustrating ESA operation in a softswitch environment. A softswitch is used in a telephone network to connect calls between phone lines via software. A softswitch is typically used to control connections at the junction point between circuit and packet networks. This switching can be a single device having both switching logic and switching fabric and can also be designed using a Call Agent and a Media Gateway.

The PSTN 510 is communicatively coupled to the switch 520 typically by bearer trunks and an A link. The switch 520 can also be coupled to any number of handsets and peripheral devices including POTS handsets 525. The switch 520 is also coupled to an IP network 545 within an ESA domain 540, typically under SIP/MGCP protocols. Within the ESA domain 540 there are a number of devices that can communicate with one or more access devices 550, wherein the access devices or IPMGs can deliver the voice, data, and video to the various handsets including POTS handsets 565 and CPE derived POTS handsets 560 via an IPMG 555, which is an on-premise device to integrate a router, an Internet modem, firewall together with Voice over IP services, enabling guaranteed voice, video, and data services simultaneously over a single connection. The network 545 can also be coupled to an IPMG device 570 that in turn can connect to CPE derived POTS 575. A softphone or IPMG 580 can also be coupled to the IP network 545. The VoIP network in this embodiment appears as native line-side interfaces.

Figure 6:
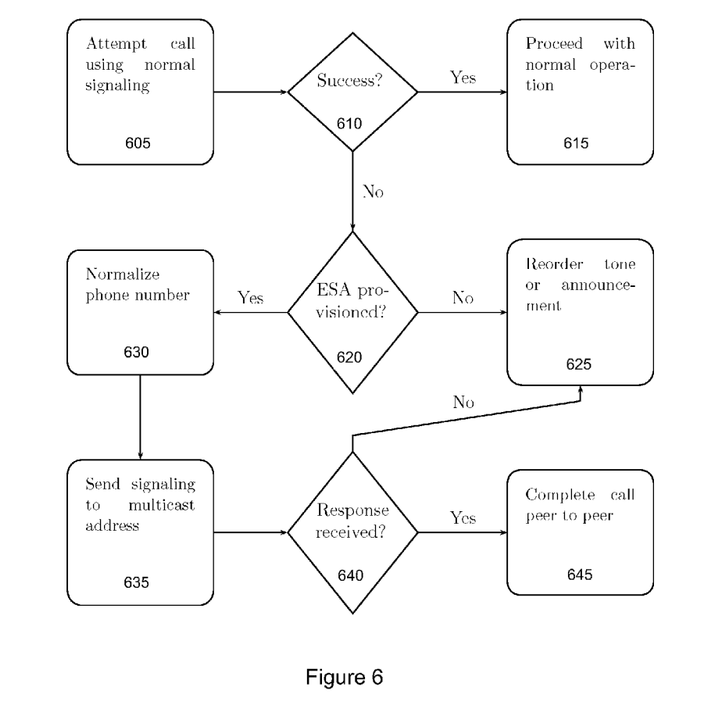
FIG. 6 is a call origination flowchart in accordance with one embodiment.

The present invention in one embodiment provides a means of insuring ESA when connectivity to the switch in the network is lost. The basic operation of one ESA embodiment according to the present invention is depicted in the flowchart of FIG. 6.

When a caller attempts to make a call from the origination endpoint, the system will attempt to use normal methods to setup the call 605. In this example, the caller dials the termination telephone number on the caller's phone which causes the originating IP media gateway to send a normal call setup message to the switch 605. If the switch is operational and accessible, it will successfully respond 610 to the IP media gateway and the call will proceed using normal methods 615. This could apply to alternate systems such as radio frequency walkie-talkies.

If the switch is malfunctioning or overloaded, or if the network path between the IP media gateway and the switch is interrupted, the IP media gateway will not receive a response. After a configurable timeout and optionally a configurable number of retries, the IP media gateway will detect a failure condition. At this point the IP media gateway will check whether ESA is provisioned 620.

If not ESA provisioned, a reorder tone or announcement is employed 625.

When ESA is provisioned, the IP media gateway will optionally normalize the phone number 630 that the user has dialed. For example, the normalization procedure can include the prepending of additional digits to the number. For example, the calling party may have only dialed seven digits, omitting the area code, and the IP media gateway would prepend the area code to the dial string. Alternatively, if the calling party dialed "1" plus ten digits, the IP media gateway would strip the "1" prefix.

Using the normalized number, the originating IP media gateway (the "originating gateway") then sends a call setup request to the provisioned IP multicast address 635. This request will contain the originating IP media gateway's IP address as well as the calling party's and called party's directory number (DN).

Any IP media gateway that receives this request and has been provisioned with the called party's DN (the "terminating gateway" or called party) sends a multicast call setup request response to the originating gateway 640. The response is sent to the provisioned IP multicast address. The response provides the unicast IP address of the terminating gateway.

The rest of the signaling for this call will be completed directly between the originating and terminating IP media gateways in peer to peer fashion using unicast IP addresses 645.

The same physical device may play the role of both originating and terminating gateway. When the originating gateway sends a call setup request to the IP multicast address, the originating gateway itself will receive a copy of the message and process it to determine if the DN is provisioned. Even in this case, all signaling is still performed using IP messages as described above, except that the IP messages do not go "on the wire" between devices.

If the originating gateway does not receive a response to the multicast request within a configurable timeout period, it may resend the request a configurable number of times, after which it may generate a reorder tone or announcement to the user 625. This will occur if the called party's DN is outside the ESA domain.

Figure 7:
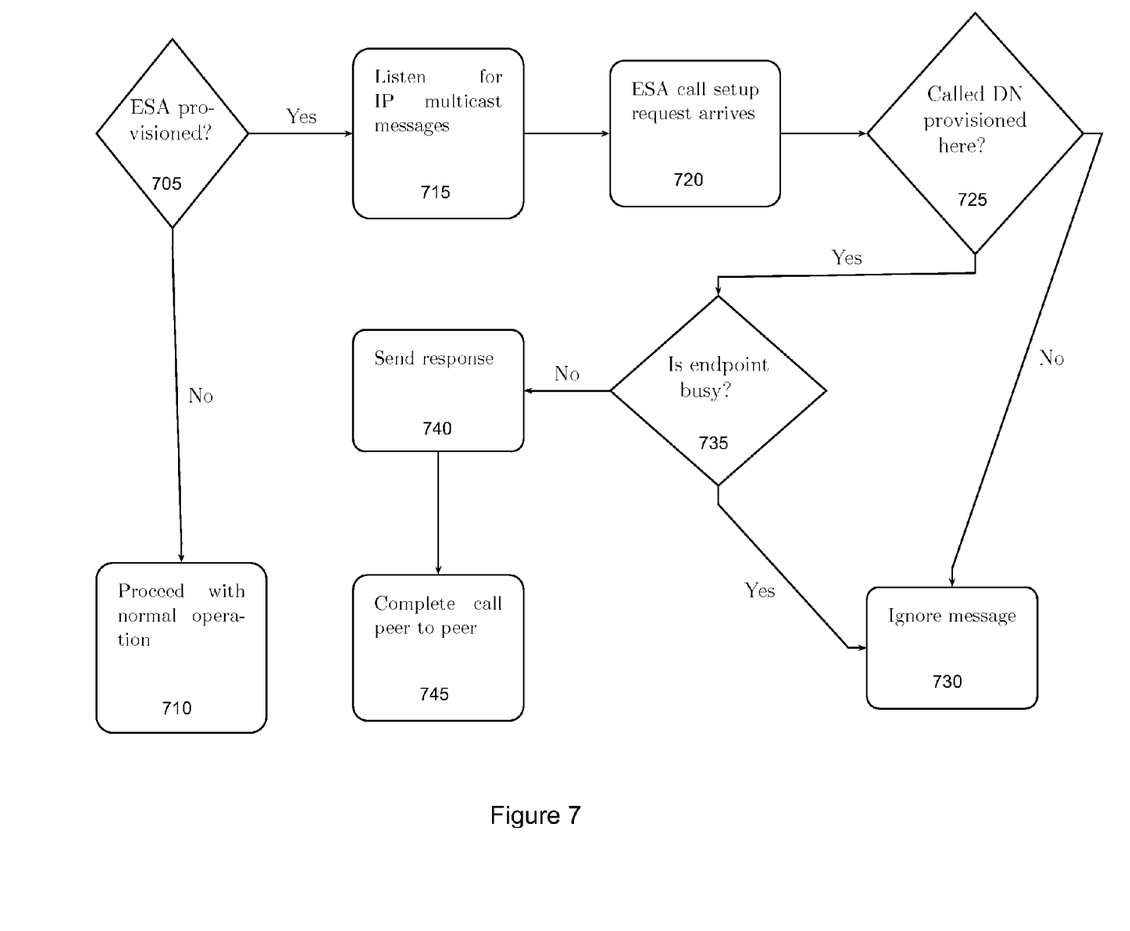
FIG. 7 is a call termination flowchart in accordance with one embodiment.

An embodiment of the procedure used by a called party or a terminating gateway to determine whether a DN is provisioned on the gateway is depicted in FIG. 7. When an IP media gateway first starts, it checks whether ESA is provisioned 705. If ESA is not provisioned, the IP media gateway uses conventional procedures for normal operation 710.

If ESA is provisioned, the IP media gateway ("terminating gateway") will monitor the provisioned IP multicast address for ESA messages during operation 715. The IP media gateway will monitor this address even while it has connectivity to the switch and the switch is operational. This is to insure that ESA messages from other devices that have lost connectivity to the switch may be processed.

When any IP media gateway on the ESA domain ("originating gateway") sends a call setup request to the IP multicast address, each terminating gateway on the ESA domain will receive a copy of the message 720.

In order to provide access to emergency services during a switch outage, the terminating gateway may optionally be provisioned with DNs to which calls are not directed by the switch during normal operation but are only consulted when an ESA call setup request arrives. In such a dynamic ESA domain configuration example, an IP media gateway may be provisioned with the DN "911" and a mapping to one or more particular users on that gateway. In a rural area, the mapping for 911 could be assigned to the homes of members of the local volunteer fire department. During an outage, calls to 911 would elicit a response from any IP media gateway with a mapping for 911. The DNs for the local fire, police, and ambulance service and others could be similarly mapped.

If the terminating gateway is provisioned with either a conventional or ESA mapped endpoint that has the same DN as the called party's DN in the call setup request, it will check whether the endpoint corresponding to that DN is busy 735.

If the endpoint is busy, it will ignore the message 730.

If the endpoint is available, the IP media gateway ("terminating gateway") sends a response 740 to the IP multicast address with the IP unicast address of the terminating gateway. This corresponds to FIG. 6 step 640. The rest of the signaling for this call will be completed directly between the originating and terminating IP media gateways in peer to peer fashion using unicast IP addresses 745. This corresponds to the description above for FIG. 6, step 645.

It is important that an IPMG with a busy endpoint does not respond with a message indicating "busy"; this allows another IP media gateway on the ESA domain with a mapping for that endpoint to respond to the call setup request and accept the call. If all endpoints are busy, there will be either an affirm or no-answer result. For example, IPMG "A" and IPMG "B" both have a mapping for 911. When a user on gateway "C" dials 911 during a switch outage, an ESA call setup message will be sent to the IP multicast address. If the endpoint mapped to 911 on gateway "A" is busy, it will not respond to the message. The endpoint mapped to 911 on gateway "B" is not busy and will respond to the message, so the call will be set up between the users on gateways "C" and "B". This helps insure that calls to 911 do not receive busy treatment to the extent that there are endpoints available to accept these calls. This procedure equally applies to other categories of calls.

Multiple endpoints on the same IP media gateway may be mapped with the same ESA DN. In this case, the gateway will select a non-busy endpoint to accept an ESA call for that DN.

An IP media gateway may optionally be provisioned to provide distinctive ringing for calls arriving via a mapped ESA DN.

An IP media gateway may optionally be provisioned to provide call waiting for calls arriving via a mapped ESA DN. For example, this may allow a single endpoint to terminate multiple simultaneous emergency calls to 911 where this is desirable and permitted by regulations.

When multiple IP media gateways with a mapping for the same DN respond to a call setup message they may be configured so that the first response received by the originating gateway is processed and other responses are ignored.

Figure 8:
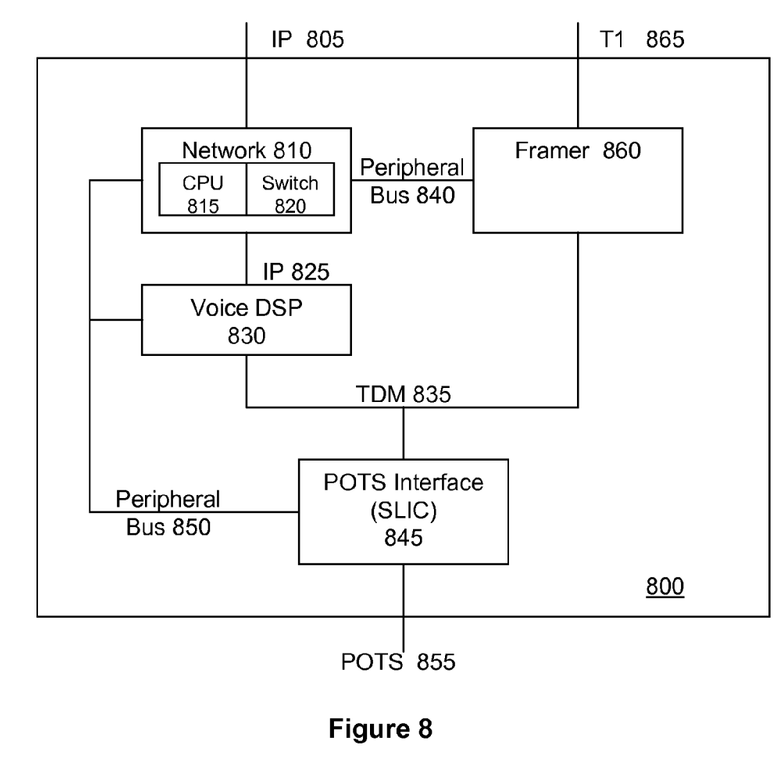
FIG. 8 is an IP/TDM hybrid design in accordance with one embodiment.

The IP/TDM hybrid device 800 design of FIG. 8 enables IP-based ESA in the event of a failure in the GR-303 telephone network. In normal operation this design acts as a channel bank (POTS/T1). Normally, signals from the POTS 855 pass through Framer 860 by TDM 835 connection out to the interface to a T1 865 connection. In the event of a failure, lines are provisioned to an IP 805 connection and controlled by the VoIP circuit, and methods for ESA control are enabled (POTS/IP). This path includes control via the Peripheral Bus 850 from the Network Processor 810 to the Voice DSP 830 and the POTS Interface (SLIC) 845. Digitized voice-band media on TDM 835 from the POTS 855 is converted at the Voice DSP 830 and proceed via internet protocol IP 825 to the interface for the Network Processor 810 comprised of CPU 815 and Switch 820. CPU 815 executes VoIP signaling protocols and switch 820 forwards IP packets onto IP 805. CPU 815 effects the transition from traditional to new state, communicating with Framer 860 by Peripheral Bus 840. The right side of 800 including 845, 835, and 860 provides the functionality of a Class 5 switch for TDM and the left side including 845, 835, 850, 830, 825, 810, 815, 820, and 840 provides fallback to VoIP. This avoids a need for multiple components, proxy, or DLC. Hybrid device 800 continuously monitors for loss of connection at 865 and switches over, enabling fallback ESA and POTS to VoIP.

In a wireless environment, the cellular phone operates typically under TDMA or CDMA with communications with a base station. The base station typically converts the wireless signals to the TDM or VoIP protocols for subsequent delivery to a handset. In the ESA mode, a wireless base station can be essentially an IPMG.

Among the embodiments of the invention is a feature where, in the background, the inviting or setup requesting VoIP device will continue to establish connectivity with the switch so that when connectivity is available, and the ESA service can be suspended for that subscriber. An ESA call already in progress will typically be unaffected when the service is restored. Polling is a technique well known in the art and routinely checks for the status of devices on the network and can ascertain when the switch is online.

As noted herein, typically the IPMG device participating in this ESA system will always be 'listening' for ESA multicast setup requests so that transition to and from the ESA mode is seamless.

As should be readily apparent, international communication is also possible in the ESA mode using the system detailed herein.

Multiple VoIP protocols including SIP, H323, MGCP, and various modes of operation are within the scope of the invention.

Furthermore, the distributed approach of the invention is not limited to VoIP, as other systems can benefit from having operational functionality without a switch or controller.

For example, in a non VoIP system such as a time domain multiplexing (TDM) system, if there is a failure that results in the ESA mode, a normal TDM operation can revert to a peer-to-peer operation as detailed herein under a protocol such as VoIP. Additionally, IP enabled cell phones could perform as IPMGs and connect directly with each other in ESA mode.

Video including video conferencing can also be implemented with the teachings of the present invention and operate in a peer-to-peer operation if the 'switch' fails.

In the ESA mode, the networked end point devices provide the communications capability and this is applicable to various forms of communications as long as the smart end points have a peer-to-peer structure with some discovery and signaling mechanisms.

As compared to having a database of known addresses, one embodiment of the present system uses the discovery protocol, such as multicast, to identify the users on the ESA network.

The IPMG can also be provisioned with ESA multicast group address, ESA Domain ID, and optional authentication. A local dial-plan can be part of the access device and participating ports may have their phone number(s) provisioned.

In one example using Media Gateway Control Protocol (MGCP), the system processes a restart in progress (RSIP) or notify (NTFY) message. If the MGCP processes an acknowledgment (ACK), this indicates that the communications pathways are functioning and the system proceeds with normal operations.

Upon a failure mode, different protocols have different mechanics. The switches can have redundant cards and it can have a name for multiple switches. But after timeout of all possibilities, the system enters ESA mode. A failure does not necessarily indicate that an entire switch is not functioning as switches may have multiple lines/jacks. And, as each call is originated, the path is checked to see if the switch is back on-line.

In the event a MGCP times-out or otherwise fails the acknowledgment, if the system is not ESA provisioned, a reorder tone or announcement is generated. If the system is ESA provisioned, the system switches to ESA mode and provides a dial-tone.

The system checks the telephone number. There are a number of checks that can be performed. When user dials a number, the local dial-plan can be evaluated for validity. The checking process can also assess standard signaling to defined proxies and upon failure take appropriate actions. For example, when a 7 digit number is dialed, the IPMG prepends the NPA of calling line to the dialed number for lookup.

In an embodiment, the system also checks whether the dialed number is part of the IPMG. In one embodiment, the access device sends a query for the DN on the ESA Multicast address. Any device which 'owns' the DN responds on the ESA Multicast group address with a DN communication. An SIP invite/signaling can be sent directly to the identified IPMG. The IPMG always 'listens' and responds to the ESA multicast group and SIP signaling if provisioned for ESA even if the access device itself is successfully registered to a MGC If the called number is local to the IPMG, the peer to peer call is completed. If not part of the local IPMG, there is a query for dialed DN mapping. The called DN is compared to a DN assigned to a receiving VoIP device, and if the query is successful, the setup request is successful and the now invitee, will respond to the setup request in a manner to direct the originating inviter to direct all subsequent signaling pertaining to this call to it.

If the query does not succeed, a reorder tone/announcement is generated. In more particular detail, if the registration process is not successful, the endpoint determines whether it can operate in ESA mode. There may be certain conditions where the ESA mode is not undertaken for a particular call even if provisioned for ESA.

There are several features that are unique to ESA system. For example, the use of IP multicast protocols gives the ESA system excellent scaling metrics. The system may be as small as a single device with at least two subscriber lines however it can be scaled to support tens of thousands of DN's due to the lack of a centralized database and the use of IP multicast protocols.

The number of VoIP devices scales well for the performance of the ESA system, and the VoIP devices participating in the ESA system can change dynamically as the IP multicast setup request will 'find' any eligible VoIP devices.

The ESA system delivers ESA capabilities without the significant burden of additional hardware equipment and should be able to be deployed at much lower costs.

The present ESA systems with auxiliary hardware providing the extra 'brain' require constant synchronization with the master as opposed to the distributed approach. All of the end points location, including changes and new phone numbers is maintained by the switch and requires synchronization to ensure that auxiliary switches are kept up to date.

One of the enhancements of providing the end points with enhanced capability is to allow for a distributed system with progressive protocols. There is no additional equipment to purchase as the necessary hardware/software is integrated with the VoIP client.

In distinction, the present distributed system employing a smarter VoIP client already knows its identification. For example, in the ESA mode when a user has placed a call to another party, a multicast message is dispatched requesting if any of the endpoints capable of processing the multicast message has the party's telephone number.

Another feature relates to dynamic sizing, wherein the ESA network can be any size and increase or decrease dynamically and still function. The size of the ESA network can be small or large and function without the switch.

It should be understood that cellular technologies that use digital signals also typically use VoIP within the network and can take advantage of the ESA techniques detailed herein.

The present invention allows for extremely small ESA domains, as small as two subscriber lines, to be cost effective and yet to be able to scale to support tens of thousands of subscriber lines.

The present invention according to one embodiment is not a bypass of the telephone company networks and requires at least some working channels. The telephone company networks typically have batteries and generators to keep the infrastructure operational.

According to one embodiment, the present invention allows for local calling between voice subscribers within an ESA enabled IP network when the end office switch (such as Class 5 or softswitch) is unreachable by the access device or media gateway. Core calling features such as Caller ID w/name, 3-way calling, call waiting, call transfer are fully supported as additional features.

Other features of the present invention include the local mapping of arbitrary DNs such as '0' and '911' which allows local routing and termination of special numbers to local ESA lines and enables alternate answering points to be defined within an ESA network. The system provides configurable ESA signaling multicast to scope ESA domains.

Yet another feature includes the automatic detection, failover and recovery, wherein there is an automatic detection of communications loss between access device/media gateway and end office switch with corresponding ESA switchover. In addition, the system automatically reverts back to normal operation when communications is restored with the end office switch.

Another feature of the invention is that the ESA functionality can be a separately licensed software feature. The pre-existing non-ESA deployments can be ESA enabled on the fly making it scalable, flexible and easy to provision with no pre-defined ESA domain boundary, no sizing required, no directory number database synchronization required.

One embodiment of the invention provides a means for basic telephone services in a VoIP environment when the connection to the Softswitch or PSTN gateway is unavailable. The system support ESA mode in multiple formats such as a SIP, GR303 or MGCP Environment.

There can be multiple ESA domains per network and each ESA domain can be scalable to support an ESA domain with a large number of subscribers.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An internet protocol time division multiplex hybrid device comprising:
   a time division multiplex path including a framer in time division multiplex communication with a plain old telephone service interface;
   an internet protocol path which includes said plain old telephone service interface in time division multiplex communication with a voice digital signal processor in internet protocol communication with a network processor including a central processing unit and a switch;

said central processing unit configured to support internet protocol emergency stand alone backup for time division multiplex communications;

said plain old telephone service interface, said voice digital signal processor, and said network processor in communication with a peripheral bus;

said network processor further in communication with said framer;

said plain old telephone service interface in communication with plain old telephone service equipment external to said device;

said framer in communication with time division multiplex equipment external to said device; and said network processor in communication with internet protocol equipment external to said device.

2. The internet protocol time division multiplex hybrid device of claim 1 wherein said internet protocol comprises voice over internet protocol.

3. The internet protocol time division multiplex hybrid device of claim 1 wherein said central processing unit is configured to support voice over internet protocol emergency stand alone communications while operating in time division multiplex mode.

* * * * *